US009140063B2

(12) United States Patent
Eggert et al.

(10) Patent No.: US 9,140,063 B2
(45) Date of Patent: Sep. 22, 2015

(54) SWITCH LADDER SENSOR FOR ROLL-UP DOOR

(71) Applicant: RYTEC CORPORATION, Jackson, WI (US)

(72) Inventors: Curtis Eggert, Milwaukee, WI (US); Andrew Schumacher, West Bend, WI (US)

(73) Assignee: Rytec Corporation, Jackson, WI (US)

( * ) Notice: Subject to any disclaimer, the term of this patent is extended or adjusted under 35 U.S.C. 154(b) by 29 days.

(21) Appl. No.: 14/057,512

(22) Filed: Oct. 18, 2013

(65) Prior Publication Data

US 2014/0110064 A1    Apr. 24, 2014

Related U.S. Application Data

(60) Provisional application No. 61/716,811, filed on Oct. 22, 2012.

(51) Int. Cl.
| | |
|---|---|
| *E06B 9/82* | (2006.01) |
| *G01B 7/14* | (2006.01) |
| *E06B 9/58* | (2006.01) |
| *E06B 9/68* | (2006.01) |

(52) U.S. Cl.
CPC ... *E06B 9/82* (2013.01); *G01B 7/14* (2013.01); *E06B 9/58* (2013.01); *E06B 2009/6845* (2013.01)

(58) Field of Classification Search
USPC .............................. 160/7, 265, 310; 49/28, 31
IPC ....................... E06B 9/82,2009/6818, 2009/689
See application file for complete search history.

(56) References Cited

U.S. PATENT DOCUMENTS

| | | | | |
|---|---|---|---|---|
| 4,375,019 | A * | 2/1983 | Yoshida | 200/52 R |
| 4,706,726 | A * | 11/1987 | Nortoft | 160/168.1 P |
| 5,353,859 | A * | 10/1994 | Oltahfer et al. | 160/310 |
| 5,540,269 | A * | 7/1996 | Plumer | 160/3 |
| 5,777,552 | A * | 7/1998 | Fischette et al. | 340/547 |
| 6,598,648 | B1 * | 7/2003 | Schulte | 160/1 |
| 7,281,561 | B2 * | 10/2007 | Anderson et al. | 160/121.1 |

FOREIGN PATENT DOCUMENTS

| | | |
|---|---|---|
| EP | 1092833 | 6/2002 |
| JP | 2003138872 | 5/2003 |
| JP | 2004300916 | 10/2004 |
| JP | 2008057230 | 3/2008 |
| WO | WO 2004/113662 A1 | 12/2004 |

* cited by examiner

*Primary Examiner* — David Purol
(74) *Attorney, Agent, or Firm* — McGuireWoods LLP

(57) ABSTRACT

A system and method for detecting damage to a door system by detecting the presence or absence of a magnetic source attached to the door system for stopping motion or reversing motion of the door to prevent any further damage to the door system. For example, a roll-up type door may be damaged by a vehicle and pulled from its vertical support guides; detecting this event causes stopping of any motion of the door, such as opening or closing the door.

19 Claims, 8 Drawing Sheets

SWITCH LADDER SENSOR FOR ROLL-UP DOOR

CROSS-REFERENCE TO RELATED APPLICATIONS

This application claims benefit and priority to U.S. Provisional Patent Application No. 61/716,811, filed Oct. 22, 2012, entitled REED SWITCH LADDER SENSOR FOR ROLL-UP DOOR, the disclosure of which is hereby incorporated herein by reference in its entirety.

BACKGROUND OF THE INVENTION 1.0 Field of the Invention

This invention is directed generally to a method and apparatus for determining faults in a door system and, more particularly, the invention is directed to determining or sensing whether or not a door such as, e.g., a roll-up door, has been impeded, adversely impacted, or the like.

2.0 Related Art

Industrial automated door safety has long been an issue with businesses attempting to keep roll-up door accident levels low. Risks are great when flexible or roll-up doors have high operating speeds that can cause serious injury to both individuals and vehicles, or trucks, when sudden or unavoidable impact is made. Often doors used commercially or in industry, for example, are exposed to many types of hazards or even breakdowns. For example, a roll-up door may be backed into by a truck that causes the roll-up door to be dislodged from its guides. This situation can create a dangerous situation to people or nearby structures, and/or may cause damage to the door. If the door is moving, such as being opened or closed, while being struck by a vehicle, for example, the door may be pulled from its guides and damage to the door may be increased due to the motion of the door (opening or closing) in an unrestrained condition.

Determining that a door has been compromised and stopping the motion of the door is of value to prevent people, structures and the door itself from being damaged or further damaged.

SUMMARY OF THE INVENTION

The disclosure overcomes the shortcomings of the prior art by providing a technique to determine that a door has been compromised for stopping motion of the door.

In one aspect, the present disclosure provides for a safer automated roll-up-style door by utilizing sensors that register impact through an uninterruptible wireless or wired signal, thereby immediately ceasing door movement, and providing significantly improved safety measures.

In one aspect, a detection system for detecting a status of a door may be provided including at least one support column to maintain a flexible door in place, a detection mechanism configured along the at least one support column to detect the presence or absence of the flexible door in relation to the at least one support column. The detection mechanism may include a plurality of switches that detects the presence of the flexible door. The detection mechanism may further include a magnetic source that influences the state of the plurality of switches. The plurality of switches may be activatable to conduct an electric flow in the presence of the magnetic source indicating that the flexible door is coupled to the at least one support column. The plurality of switches may be configured to stop conducting an electric flow in the absence of the magnetic source, indicating that the flexible door is not coupled to the at least one support column. The flexible door may comprise a roll-up door.

In one aspect, a detection system for detecting a status of a door is provided that includes a plurality of support columns to maintain a flexible door in place therebetween, a detection mechanism configured along at least one of the support columns to detect the presence or absence of the flexible door in relation to the at least one support column, wherein the detection mechanism is configured to signal to stop motion or reverse motion of the roll-up door if absence is detected. The detection mechanism may comprise a plurality of switches that detect the presence or absence of the flexible door and may comprises a magnetic source that influences the plurality of switches. The plurality of switches may be activatable to conduct an electric flow in the presence of the magnetic source indicating that the flexible door is coupled to the at least one support column and the plurality of switches may be configured to stop conducting an electric flow in the absence of the magnetic source, indicating that the flexible door is not coupled to the at least one support column. The detection system may further include a break-away tab configured with the magnetic source, and the break-away tab connected to the flexible door, the break-away tab configured to be coupled to the support column and configured to move along the support column as the flexible door is opened or closed. The detection mechanism may comprise a plurality of switches arranged on at least one circuit board, the plurality of switches configured to react to the presence of a magnetic source. The plurality of switches may be activatable to conduct an electric flow in the presence of the magnetic source indicating that the flexible door is coupled to the at least one support column the plurality of switches are configured to stop conducting an electric flow in the absence of the magnetic source, indicating that the flexible door is not coupled to the at least one support column. The at least one circuit board may comprise a plurality of circuit boards connectable by a connector and configured to be installable along the at least one support column.

In one aspect, a method of detecting a status of a door may include the steps of detecting presence or absence of a break-away tab that is connected to a flexible door and slideably coupled to a support column, and stopping motion or reversing motion of the flexible door if absence of the break-away tab is detected at the support column for preventing damage to the flexible door or the flexible doors' surroundings. The method may further include the step of configuring at least one magnetic source on the break-away tab. The method may further comprise the step of configuring magnetic sensitive devices along the support column that detect the presence or absence of the magnetic source.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

DETAILED DESCRIPTION OF THE DISCLOSURE

Figure 1:
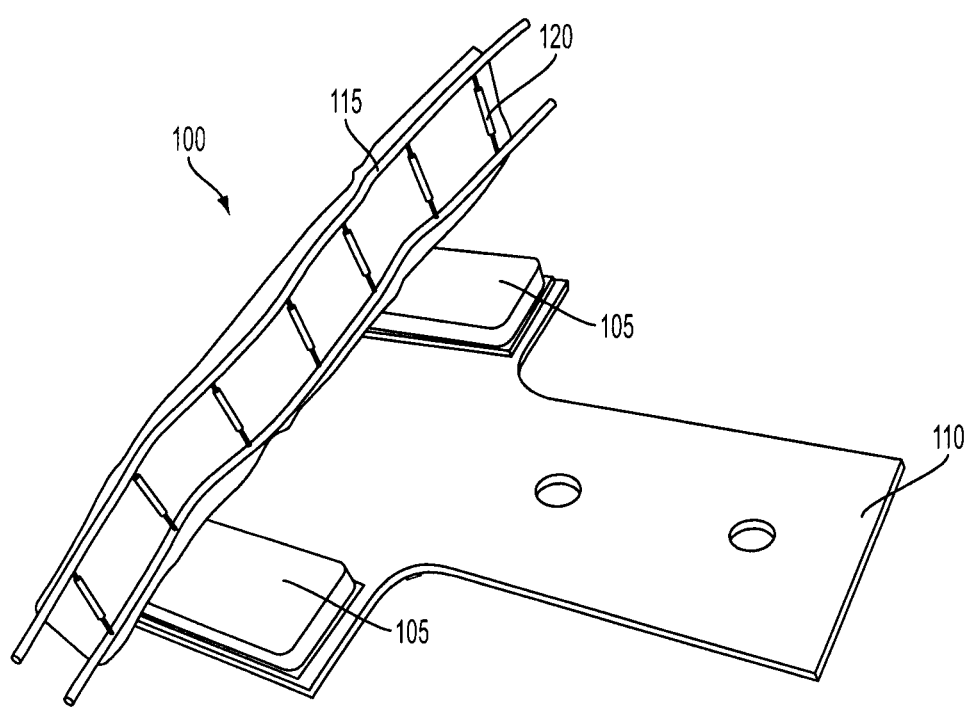
FIG. 1 shows a perspective view of an exemplary break-away tab and exemplary detection mechanism, constructed according to the principles of the disclosure.

The examples of the disclosure and the various features and advantageous details thereof are explained more fully with reference to the non-limiting examples that are described and/or illustrated in the accompanying drawings and detailed in the following description. It should be noted that the features illustrated in the drawings are not necessarily drawn to scale, and features of one example may be employed with other examples as the skilled artisan would recognize, even if not explicitly stated herein. Descriptions of well-known components and processing techniques may be omitted so as to not unnecessarily obscure the various aspects of the disclosure. The examples used herein are intended merely to facilitate an understanding of ways in which the disclosure may be practiced and to further enable those of skill in the art to practice the principles of the disclosure. Accordingly, the examples herein should not be construed as limiting the scope of the disclosure, which is defined solely by the appended claims and applicable law. Moreover, it is noted that like reference numerals represent similar parts throughout the several views of the drawings.

Figure 3:
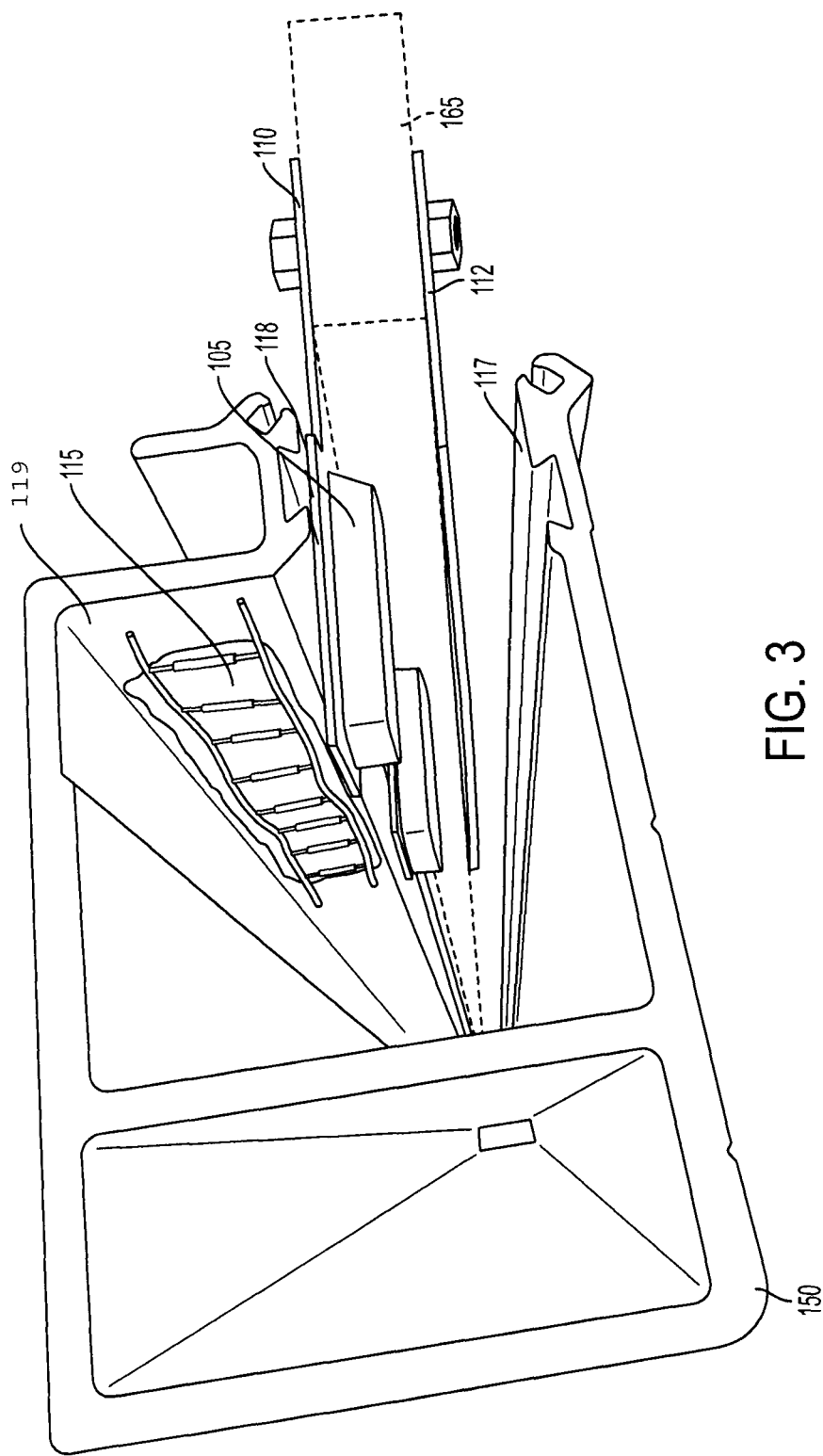
FIG. 3 shows a cross-sectional perspective view of an example of the support column of FIG. 2 configured with the break-away tab and detection mechanism of FIG. 1, configured according to the principles of the disclosure.

FIG. 1 shows a perspective view of an exemplary break-away tab and exemplary detection mechanism, constructed according to the principles of the disclosure. The break-away tab 110 is shown configured with at least one magnet 105. The break-away tab 110 is configured to be mounted or connected to a door 165 (FIG. 4) and also configured to be insertable into a support column 150 (FIG. 3). The break-away tab 110 may be configured to guide a door 165 such as a flexible type door in the support column 150 when being opened or closed.

A break-away tab 110 is a general term used herein to describe a structure or member associated with a door that may be configured to engage or couple the door to a support column(s). The break-away tab might be an integral part of the door such as, e.g., a bottom bar of the door. Alternatively, the break-away tab might comprise a separate attachable mechanism that couples the door with the support column such as, e.g., a wind-tab, or separate attaching device. The break-away tab may be configured to be inserted into a support column while permitting the break-away tab to move along the extent of the support column 150 when a door opens or closes, and also is configured to be disengaged from (e.g., released from) the support column 150 such as when the door might be compromised in some way. For simplicity, the break-away tab described herein is shown as a separate attachable structure, but is not limited to this. The break-away tab may comprise a slideably guiding mechanism to maintain the door 165 in alignment with the support column, while permitting the door to open and close.

The detection mechanism 100 may comprise at least one magnet 105 and a series of magnetic sensitive devices such as switches 120. The switches 120 may comprise, for example, reed type switches arranged in parallel to form a ladder strip 115 that may be configured to conduct electrical current when one or more of the switches 120 are in a closed state. As described more below, the at least one magnet 105 can operationally affect or influence the functional state of the switches 120 which are configured to detect presence or absence of a proximal magnetic field produced by the at least one magnet 105. The break-away tab 110 should be constructed from material that will not unduly hinder the effects of the at least one magnet.

Figure 2:
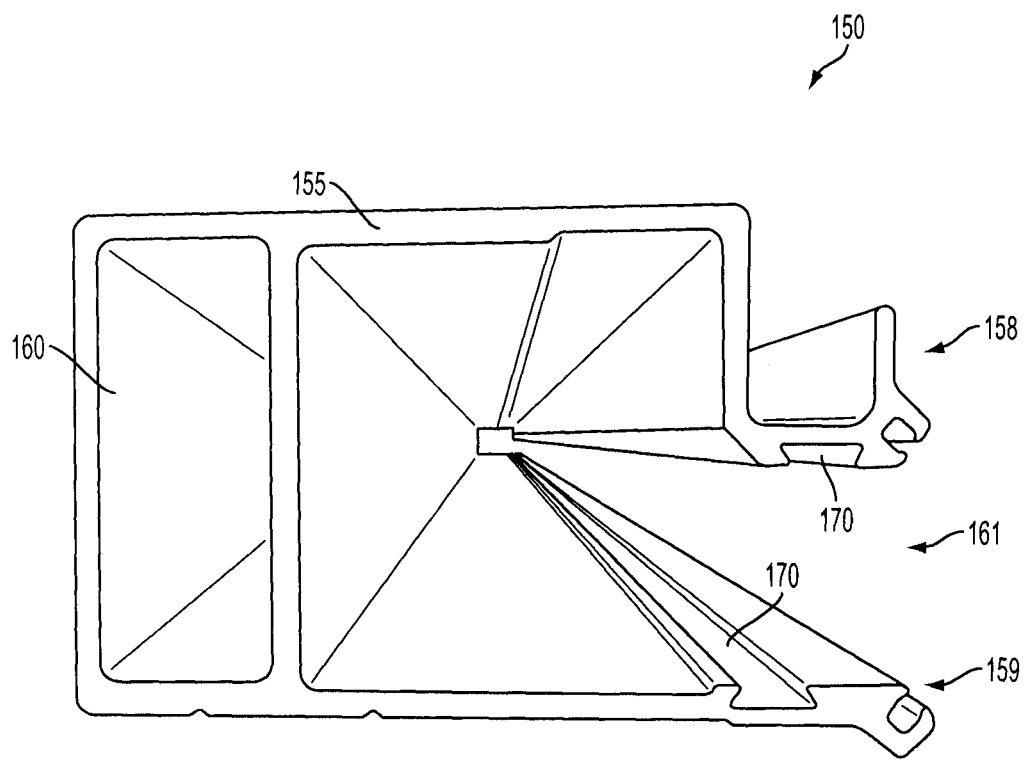
FIG. 2 shows a top perspective view of an exemplary structural support column for receiving the break-away tab and detection mechanism of FIG. 1, configured according to the principles of the disclosure.

FIG. 2 shows a top perspective view of an exemplary support column 150 for receiving the break-away tab 110 and detection mechanism 100 of FIG. 1, configured according to the principles of the disclosure. The support column 150 may be configured to be mounted to a building wall, or other structure, and may serve as a vertical guide for permitting a door 165 (FIG. 4) such as a flexible door to travel along when opening or closing the door. The flexible door might comprise a roll-up type door. The support column 150 may be configured with outer walls 155 and may be configured to have one or more hollow portions 160 formed therein. The hollow portion 160 may form an electrical chase for permitting passage of wiring from a first location of the support column 150 to a second location. The hollow portion 160 may be used, e.g., to facilitate electrical wiring of the ladder strip 115.

FIG. 3 shows a cross-sectional perspective view of the support column of FIG. 2 configured with the break-away tab and detection mechanism of FIG. 1, assembled according to the principles of the disclosure. The support column 150 may be configured with a first part of the detection mechanism 100 comprising the ladder strip 115 of switches 120. The ladder strip 115 may be arranged along the inner surface 119 of one of the walls of the support column 150. The ladder strip 115 shown in FIG. 3 may extend along the vertical height of the support column 150 as needed, which may have a length approximating the height of a door. However, different lengths might be used as appropriate for different control installations.

FIG. 3 further shows the break-away tab 110, with the at least one magnet 105, connected to or mounted on door 165. FIG. 3 is illustrative and different techniques may be employed to mount the break-away tab 110 to or on door 165. The break-away tab 110 may be inserted within the support column 150 so that the door is held in place while permitting the door 165 and break-away tab 110 with the at least one magnet 105 to travel freely along the support column 165 when opening and closing the door 165. Alternately, a magnetic source such as the at least one magnet 105 may be configured on the door itself, or other device coupling the door 165 with the support column 150. The magnetic source such as the at least one magnet 150 may comprise an electromagnetic source.

The at least one magnet 105 may be positioned so that at least one magnet 105 will be in proximity to at least one of the switches 120 as the break-away tab 110 travels along the support column 150. Preferably, two magnets 120 may be configured and spaced apart so that at least one of the two magnets 120 will always be in proximity to a switch 120, causing at least one switch 120 to activate and conduct an electrical current, signifying that the break-away tab 110 is still in place within the support column 150. The plurality of magnets 120 may be positioned and spaced apart in relation to one another on the break-away tab 110 so that at least one of the magnets 105 will be proximate to at least one of the plurality of switches 120 when in motion along the support column 150.

If, however, the door 165 is pulled from the support column 150, perhaps because of an accidental impact by a vehicle, the break-away tab 110 and the at least open magnet 105 will also be pulled out of the support columns 150. The door 165 is no longer coupled to the support column 150. When no magnet 105 is present along the support column 150 and so that the magnets 105 are no longer in proximity to the switches 120, no current will flow in the ladder strip because none of the switches 120 of the ladder strip 115 is in proximity to a magnet 105. This condition may be detected by a control circuit that may send a signal that causes the door 165 to stop moving or to prevent it from beginning to move. The signal may cause, e.g., a motor to stop or prevent the motor from running that raises or lowers the door 165. Whenever the door 165 has been compromised by being pulled from, disengaged or decoupled from the support structure 150, further damage to the door 165 and perhaps to the neighboring environment is contained by stopping or preventing motion of the door 165.

The break-away tab 110 may be constructed and configured to be pulled from the support column 150 upon a predetermined amount of lateral force being imparted on the break-away tab 110 such as when the door 165 is struck by a vehicle. In one aspect, the break-away tab 110 may be configured to be loosely and/or slideably coupled to the support column 150, while also being configured to be pulled from the support column 150. The break-away tab 110 may be configured to decouple from the support column 150 such as, e.g., due to a head-on impact by a vehicle or other object. The break-away tab 110 may also be configured to disengage from the support column 150 when, e.g., a bottom bar of a door 165 sags or flexes sufficiently to cause the breakaway tab 110 to disengage laterally from the support column 150. This might happen, for instance, if the door encounters an object in its path when closing and causes the door 165 to flex or distort. For example, the door 165 might flex at the middle part of the door 165 due to an object being encountered at one end of the door 165. Or, the door 165 might flex at both ends due to encountering an object towards the middle of the door 165, causing one or both ends of the door 165 to move laterally and causing the break-away tab 110 (or break-away tabs at each end) to disengage from the support columns 150.

In one aspect, the support column 150 may be configured with two opposing extended portions 158, 159 arranged on one side of the support column 150 so that the extended portions 158, 159 form an opening 161 that permits a break-away tab 110 to be inserted therebetween. The extended portions 158, 159 may have door guiding surfaces 117, 118 that may each be configured with retaining features 170 that are configured to assist in retaining a break-away tab 110 and associated door 165 within the support column 150. For example, the dovetail slots 170 on the top and bottom extended portions 158, 159 may have plastic wear strips (not shown) inserted therein to help guide an inserted door 165 and associated break-away tab 110. The clearance between the break-away tab 110 and the extended portions 158, 159 may vary depending on specific applications and door widths. The break-away tab 110 may be configured with retention features (not shown) that may assist in keeping the break-away tab 110 and door 165 restrained within the support column 150 while being configured to permit the break-away tab 110 and door 165 to be pulled from the support column 150 when lateral forces are present on the door 165 such as due to a collision with the door 165 by a vehicle. The break-away tab 110 may be secured to a door 165 using a retainer 110 such as, e.g. a bolt and nut. A plate 112 may be employed on the opposite side of the door for receiving the bolt. In some embodiments, the plate 112 may be an integral part of the break-away tab 110, i.e., constructed as one piece, to receive the door 165 therebetween.

Figure 4:
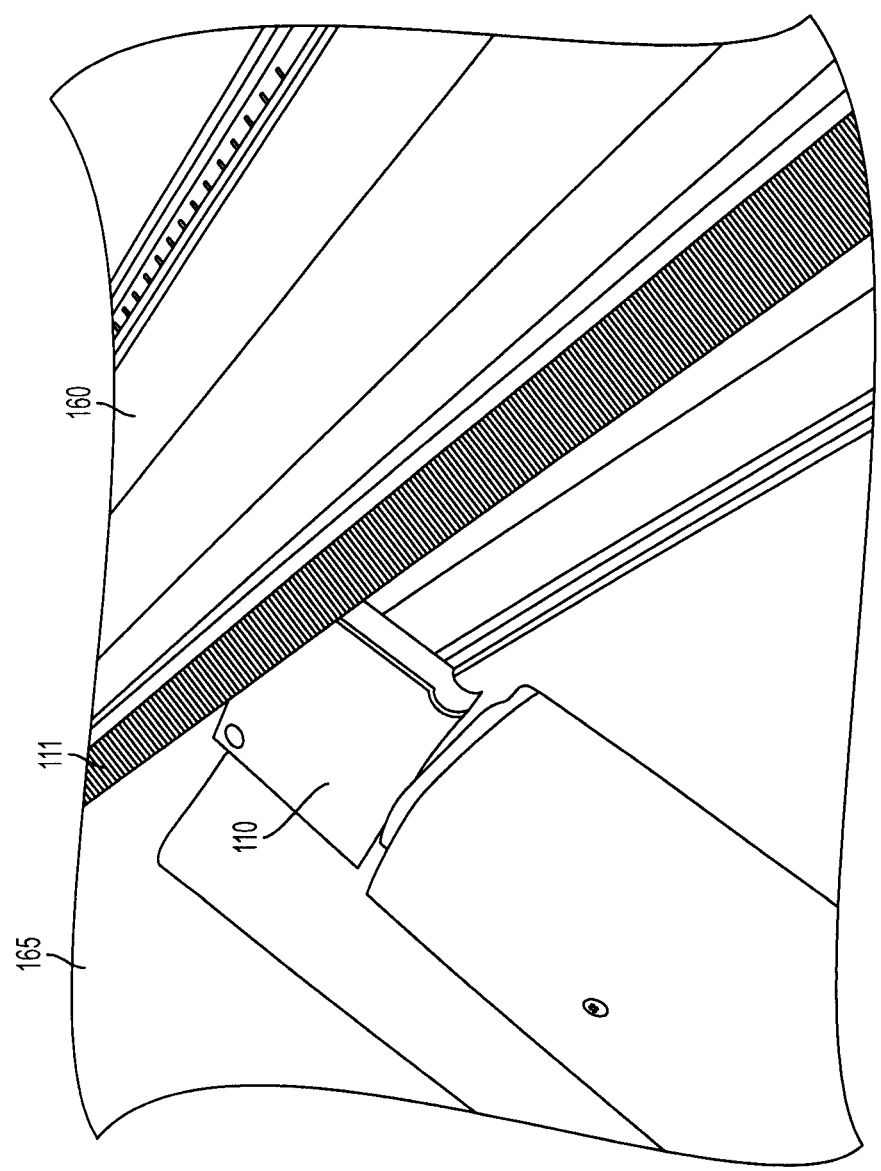
FIG. 4 shows an example of a close up view of a door and associated break-away tab being inserted into a support column, configured according to the principles of the disclosure.

FIG. 4 shows an example of a close up view of a door 165 and associated break-away tab 110 being inserted into a support column 150, configured according to the principles of the disclosure. In this example, the door 165 is shown as a flexible and pliable rollup type door that can be gathered partially to create a momentary pleat which may assist in inserting the door 165 into the support column 150.

In some embodiments, the break-away tab 110 may be covered with a sleeve to assist in retaining the break-away tab within the column 150. A cover 160 may be optionally employed to cover the support column 150. A bristle strip 111 may be configured within or along the support column 150. Perhaps using one or more slots configured along the extended portions 158, 159. The bristle strip 111 may assist in preventing air from flowing freely past the door 165 at a junction with the support column, when the door 165 is in a closed position.

Figure 5:
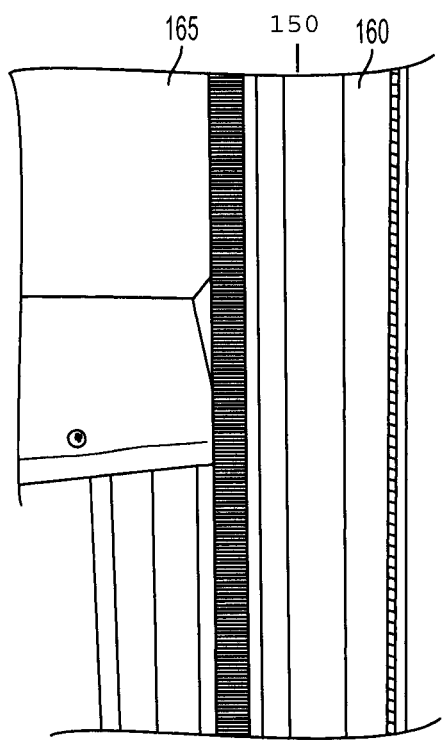
FIG. 5 shows a partial front view of an exemplary assembly of a door panel with a support column, configured according to the principles of the disclosure.

FIG. 5 shows a partial front view of an exemplary assembly of a door 165 panel and a support column 150, configured according to the principles of the disclosure. A break-away tab 110, which is now located within the support column 150, maintains the door 165 in relation to the support column 150, while permitting the door to be raised or lowered. The door 165 and break-away tab 110 is guided by the support column 150. The ladder strip 115 may be configured along a surface of the support column.

Figure 6:
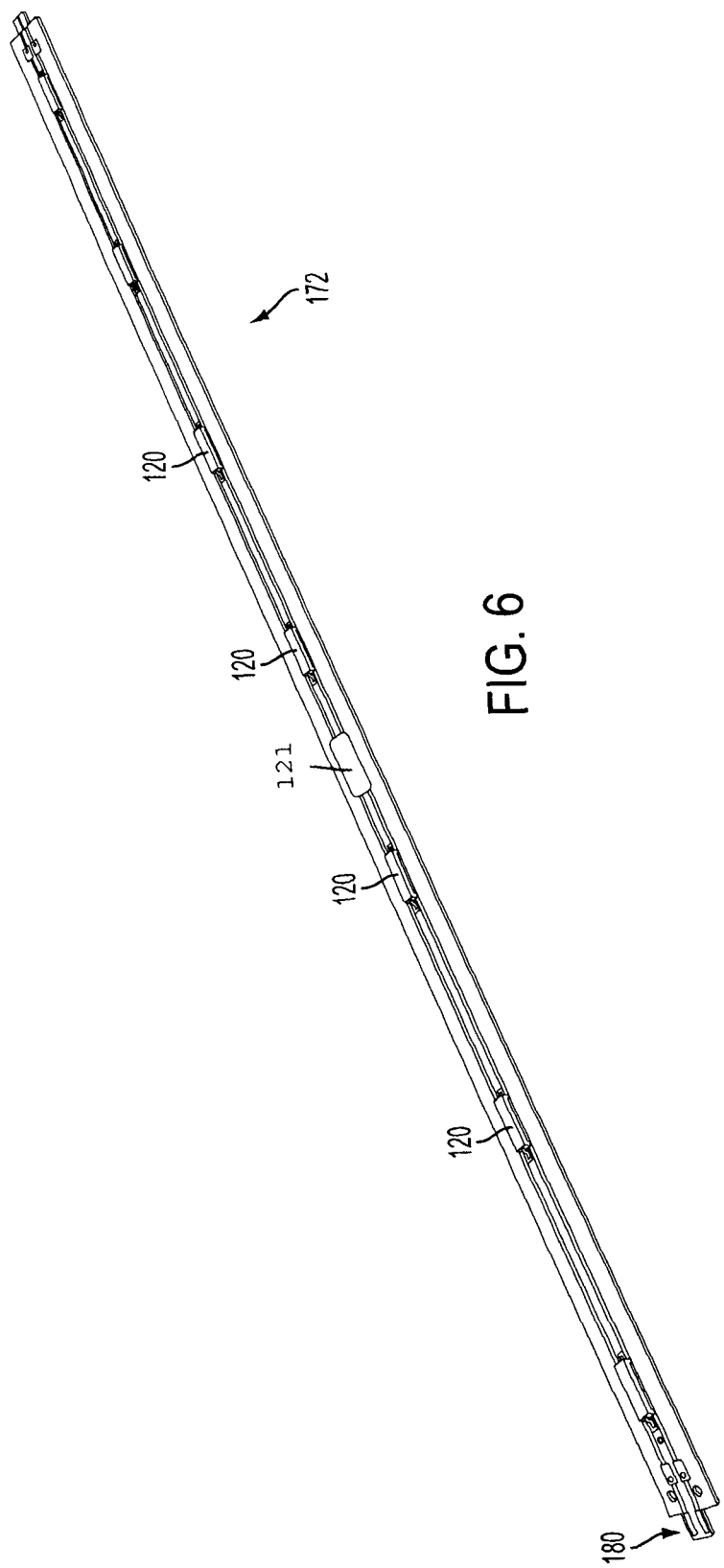
FIG. 6 shows an example of part of the detection mechanism as a single circuit board, according to the principles of the disclosure.

FIG. 6 shows an example of part of the detection mechanism configured as a single circuit board 172, according to the principles of the disclosure. A circuit board 172 may be used instead of the ladder strip 115 in the same way as the ladder strip 115, in each example describe herein. The circuit board 172 is configured with switches 120 which may be reed switches connected in parallel. The circuit board 172 may include a connection point 180 which may be an edge connector to permit more than one circuit board 180 to be joined together. A label 121 may be used to identify the type of board.

Figure 7:
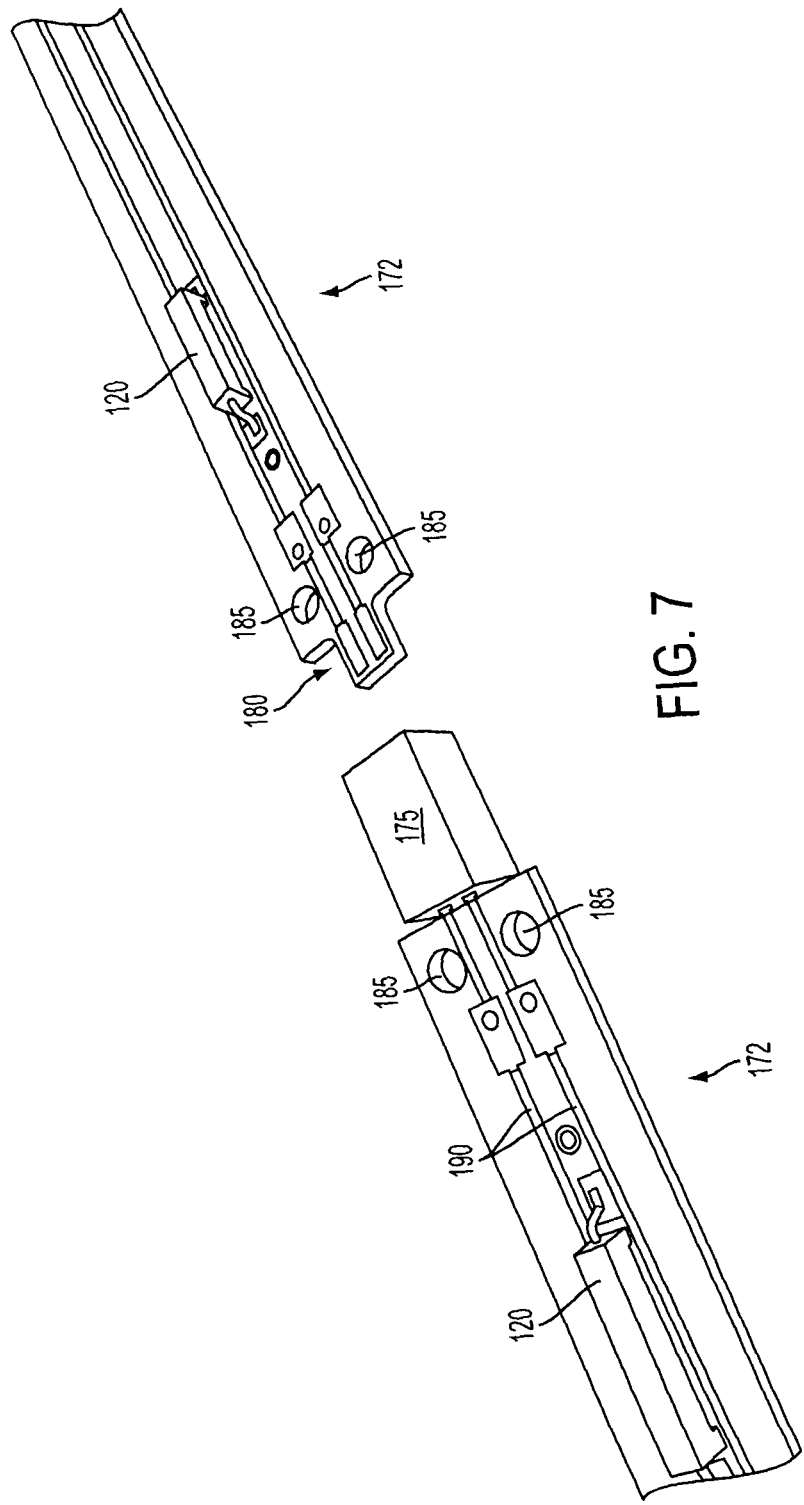
FIG. 7 shows an example of a plurality of circuit boards of FIG. 6 connected together to form an extended circuit board, configured according to the principles of the disclosure.

FIG. 7 shows an example of a plurality of circuit boards 172 of FIG. 6 connected together to form an extended circuit board, configured according to the principles of the disclosure. A connector 175 may be used to connect the plurality of circuit boards 172 together. Also shown in FIG. 7 are the traces 190 for connecting the switches 120 together. Solder holes 185 may be configured in the circuit boards 172 for connecting to external power source (not shown) to the traces 190 for powering the switches 120. A circuit board 172 may be cut to size for tailoring the overall length of the plurality of circuit boards to fit a particular application.

The circuit boards 172 may be configured with a non-conductive coating to prevent moisture or condensation which may adversely affect the performance or longevity of the circuit board and components and/or to prevent moisture and condensation from shorting the circuit. Furthermore, the series of circuit boards 172 may be slid into a plastic sealed enclosure to additionally prevent moisture and condensation from reaching the components. The circuit boards 172 may be mounted to the support column 150 by various known techniques including, but not limited to, e.g., adhesive, screws, bolts, clamps, straps, retainers and similar connecting techniques.

Figure 8:
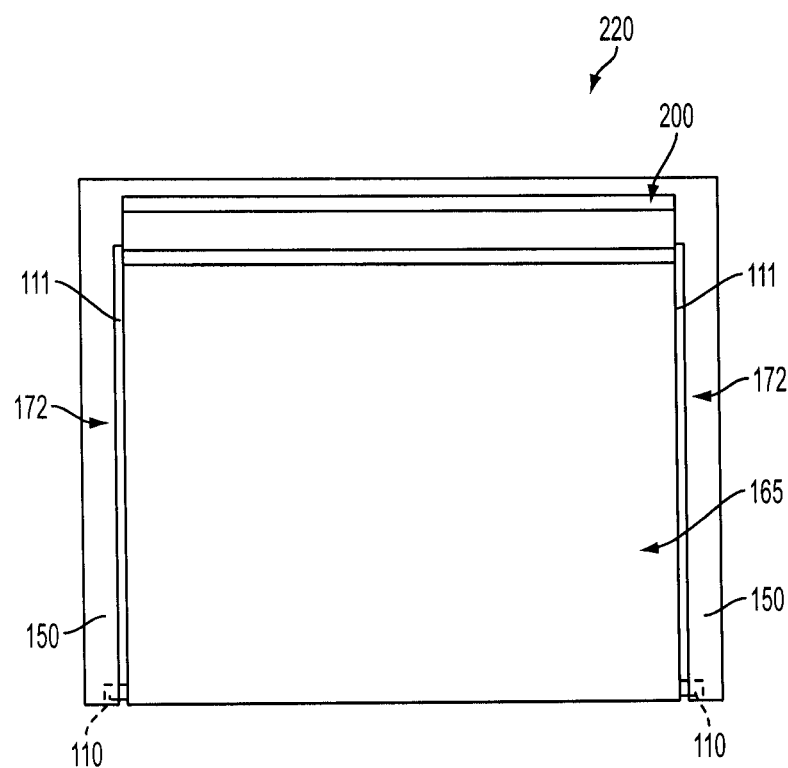
FIG. 8 shows an example assembly of a detection mechanism configured according to principles of the invention with an exemplary door, the assembly configured according to principles of the invention.

FIG. 8 shows an example assembly 220 of a detection mechanism 100 configured according to principles of the invention, with an exemplary door 165, the assembly configured according to principles of the invention. The assembly 220 ay include two support columns 150, one or both having a detection mechanism 100 therewithin. The detection mechanism may be configured with either the ladder strip 115 or the circuit boards 172, as described above. The door 165 is shown disposed between two support columns with a break-away tab 110 at each end of the door 165. One or more magnets 105 may be configured on the break-away tabs 110. The door 165 is illustrated as a roll-up door that may be rolled-up in an overhead 200 by an electrical motor therein. In one aspect, a wireless or wired connection may be used to convey status of the roll-up door 165 from the detection mechanism 100 for stopping the electric motor.

The detection mechanism 100 configured within the support column 150, as shown in relation to, e.g., FIG. 3, may continuously monitor the door. If the door 165 is ever pulled out of the support column 150, such as being hit by a vehicle, the break-away tab 110 with the one or more magnets 105 will likely be pulled from the support column 150. As a result, the magnets 105 are removed from proximity of the switches 120 that are a part of the ladder strip 115 or the circuit boards 172 (whichever is being used). Any closed switch 120 will then open due to the magnetic field being removed. The electric path flowing through one or more of the switches 120 is disrupted, which is a detectable event. The disruption of the electrical path may then cause the electric motor to be turned off, which in turn causes the door to be stopped, or to be prevented from moving. In this way, damage to a door 165 (or its surroundings) that has been compromised can be minimized.

In one aspect, but not required, the configuration of the switches 120 relative to the door 165 may be arranged such that a diagnostic test can be performed to determine if the switches 120 are being falsely activated by anything such as, e.g., a shorted wire, failed switch, magnetic fields in the installation proximity, or the like. To provide an opportunity to perform the diagnostic test, a short, nominal, section of switches 120 may be intentionally omitted from the full height of the support column 150. The height of this omission is known by a controller (not shown) that may be connected to the detection mechanism 100, with the door motion being assumed normal. During this time, the controller may sense if the circuit is fully open. The intentionally omitted section may be applied to the top of the door travel allowing the controller to perform the test each time the door 165 is fully open. The omitted section could also be configured at the bottom of the side columns or in the middle.

In one aspect, an additional or alternative feature (not shown) that follows the spirit of the disclosure, might include placing inductive sensors on the leading edge of the door 165, and introducing a magnetic field within the side column for the length of the side column. In this way, the inductive sensors might detect when the door 165 has been compromised in a similar fashion as described above.

In one aspect, an additional or alternative feature that follows the spirit of the disclosure might include using intermittent magnetic sources and switches (or other magnetic sensing devices) in combination with a timer. In this variation, a controller or similar device might be configured to calculate the time between interactions of the magnetic sources and switches based on the speed of the door; providing a window of acceptable time between interactions. If the time between interactions is too long, as compared with a predetermined expected time, the controller may then interpret the door motion has been adversely interrupted, thereby causing stopping or reversing motion of the door 165.

In one aspect, an additional or alternative feature that follows the spirit of the disclosure may be to uniquely identify each sensor (e.g., switch) to allow a controller to interpret the location of the door is relative to an open or closed position. One example of this feature may include using resistors at each switch which could be quickly coded within the controller to calculate positional data. To further the concept of positional feedback, unique sensors could be used to cause conditional changes in the controller such as, but not limited to, speed changes, door accessories, acceleration ramps, full open information, and full closed information.

The disclosure herein has been described in relation to switches that are "normally open" and interaction with the magnetic field which closes a circuit. It should be understood to one of ordinary skill in the art, that an alternate configuration and implementation following the spirit of the disclosure may utilize switches that are "normally closed;" wherein the magnetic field causes the state change to open the circuit. The opening event may then cause the motion of the door 165 to stop or reverse.

In one aspect, utilizing hall sensors or other inductive switching electrical components may be alternatively used for the function described in relation to the switches 120.

In one aspect, a further variation may be to use a breakaway tab or bottom bar that is made of a magnetic material where it produces its own magnetic field that can be detected by sensors or switches within or proximate the support column.

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications, or modifications of the disclosure.

What is claimed is:

1. A detection system for detecting a status of a door, comprising:
    at least one support column to maintain a flexible door in place; and
    a detection mechanism comprising a plurality of switches configured along the at least one support column and the detection mechanism further comprising at least one magnetic source coupled to the flexible door,
    wherein the plurality of switches are arranged so that at least one magnetic source is always activating at least one of the plurality of switches for conducting electrical flow as the flexible door moves along the at least one support column unless the at least one magnetic source is no longer proximate to any of the plurality of switches thereby stopping electrical flow due to the flexible door and the at least one magnetic source being pulled, disengaged or decoupled from the at least one support column.

2. The detection system of claim 1, wherein the plurality of switches are activatable to conduct an electric flow in the presence of the at least one magnetic source indicating that the flexible door is coupled to the at least one support column.

3. The detection system of claim 1, wherein the plurality of switches are configured to stop conducting an electric flow in the absence of the magnetic source, indicating that the flexible door is not coupled to the at least one support column.

4. The detection system of claim 1, further comprising a break-away tab configured with the at least one magnetic source, and the break-away tab connected to the flexible door, the break-away tab configured to be coupled to and move along the at least one support column, and the break-away tab configured to be decoupled from the at least one support column.

5. The detection system of claim 4, wherein the at least one magnetic source comprises a plurality of magnets.

6. The detection system of claim 5, wherein the plurality of magnets are positioned and spaced apart in relation to one another on the break-away tab so that at least one of the magnetics always remains proximate to at least one of the plurality of switches when in motion along the support column unless the break-away tab is decoupled from the at least one support column.

7. The detection system of claim 1, wherein the at least one support column comprises two spaced apart support columns, each configured with the plurality of switches a detection mechanism for detecting that the flexible door is no longer coupled to at least one of the support columns.

8. The detection system of claim 1, wherein the flexible door comprises a roll-up door.

9. A detection system for detecting a status of a door, comprising:
   a plurality of support columns to maintain a flexible door in place therebetween; and
   a detection mechanism comprising a plurality of switches configured along at least one of the support columns to detect the presence or absence of the flexible door in relation to at least one of the plurality of support columns,
   at least one magnetic source configured to produce a magnetic field and coupled to the flexible door;
   wherein the plurality of switches are arranged and located so that the magnetic field is always activating at least one of the plurality of switches permitting electrical flow as the flexible door and magnetic field moves in relation to the plurality of support columns as the flexible door is opened or closed,
   wherein the detection mechanism is configured to signal to stop or reverse motion of the flexible door if absence of the electrical flow occurs.

10. The detection system of claim 9, wherein the plurality of switches are activatable to conduct an electric flow in the presence of the magnetic field indicating that the flexible door is coupled to the at least one support column and the plurality of switches are configured to stop conducting an electric flow in the absence of the magnetic field, indicating that the roll-up door is not coupled to the at least one support column.

11. The detection system of claim 9, further comprising a break-away tab configured with the magnetic source, and the break-away tab connected to the flexible door, the break-away tab configured to be coupled to the support column and configured to move along the support column as the flexible door is opened or closed.

12. The detection system of claim 9, wherein the detection mechanism comprises a plurality of switches arranged on at least one circuit board, the plurality of switches configured to react to the presence of a magnetic source.

13. The detection system of claim 12, wherein the plurality of switches are activatable to conduct an electric flow in the presence of the magnetic source indicating that the roll-up door is coupled to the at least one support column the plurality of switches are configured to stop conducting an electric flow in the absence of the magnetic source, indicating that the flexible door is not coupled to the at least one support column.

14. The detection system of claim 12, wherein the at least one circuit board comprises a plurality of circuit boards connectable by a connector and configured to be installable along the at least one support column.

15. The detection system of claim 9, wherein the flexible door comprises a roll-up door.

16. A method for detecting a status of a door, comprising the steps of:
   detecting presence or absence of a break-away tab that is connected to a flexible door and slideably coupled to a support column; and
   stopping motion of the roll-up door if absence of the break-away tab is detected at the support column for preventing damage to the flexible door or surroundings,
   wherein the break-away tab comprises at least one magnetic source and the support column comprises a plurality of detectors activatable by the magnetic source, wherein the plurality of detectors are arranged so that the at least one magnetic source is always activating at least one of the plurality of detectors permitting electric flow as the break-away tab and the at least one magnetic source moves along the at least one support column as the flexible door is opened or closed, and absence of electrical flow causing motion of the flexible door to stop.

17. The method of claim 16, wherein the at least one magnetic source is a plurality of magnetic sources and spaced apart from one another so that at least one of the plurality of magnetic sources is always proximate to one of the plurality of detectors as the flexible opens and closes thereby permitting electrical flow, and absence of electric flow causing a signal to stop motion of the flexible door.

18. The method of claim 17, wherein the plurality of detectors comprises a plurality of switches responsive to the plurality of magnetic sources.

19. The method of claim 16, wherein the flexible door comprises a roll-up door.

* * * * *